US009787402B2

(12) United States Patent
Flintham et al.

(10) Patent No.: US 9,787,402 B2
(45) Date of Patent: Oct. 10, 2017

(54) OPTICAL COMPONENT

(71) Applicant: Oclaro Technology Limited, Northamptonshire (GB)

(72) Inventors: Barrie Flintham, Totnes (GB); Adrian Perrin Janssen, Devon (GB); Stephen Gardner, Devon (GB); Andrew Cannon Carter, Northants (GB)

(73) Assignee: OCLARO TECHNOLOGY LIMITED, Northamptonshire (GB)

( * ) Notice: Subject to any disclaimer, the term of this patent is extended or adjusted under 35 U.S.C. 154(b) by 0 days.

(21) Appl. No.: 15/125,915

(22) PCT Filed: Mar. 5, 2015

(86) PCT No.: PCT/EP2015/054568
§ 371 (c)(1),
(2) Date: Sep. 13, 2016

(87) PCT Pub. No.: WO2015/135821
PCT Pub. Date: Sep. 17, 2015

(65) Prior Publication Data
US 2017/0019181 A1    Jan. 19, 2017

(30) Foreign Application Priority Data
Mar. 14, 2014   (GB) .................................. 1404603.1

(51) Int. Cl.
*H04B 10/04*   (2006.01)
*H04B 10/50*   (2013.01)
(Continued)

(52) U.S. Cl.
CPC ....... *H04B 10/5053* (2013.01); *G02B 6/2766* (2013.01); *G02B 6/2773* (2013.01);
(Continued)

(58) Field of Classification Search
CPC .............. H04B 10/532; H04B 10/5055; H04B 10/5561; H04B 10/516; H04B 10/50575;
(Continued)

(56) References Cited

U.S. PATENT DOCUMENTS 2,997,922 A    4/1958 Kaprelian
3,307,897 A    3/1967 Lohmann
(Continued)

FOREIGN PATENT DOCUMENTS

CN    102809830 A    12/2012
CN    202818311 U    3/2013
(Continued)

OTHER PUBLICATIONS

Beling, A., et al., "Fully-Integrated Polarization-Diversity Coherent Receiver Module for 100G DP-QPSK," Proceedings of OFC/NFOEC, Mar. 6-10, 2011, 3 Pages.
(Continued)

*Primary Examiner* — Hanh Phan
(74) *Attorney, Agent, or Firm* — Fenwick & West LLP

(57) ABSTRACT

Methods and apparatus for use in coherent transmission and reception of optical data signals. An integrated optics block (100) for use in a coherent optical transmitter comprising: a beam splitter (102) configured to split an input light signal into first and second input light signals, to output the first input light signal for use in an optical transmitter chip and to output the second input light signal for use as a local oscillator signal; a polarization combiner (104) configured to combine first and second received modulated light signals to form an output; and a polarization rotator (106) configured to rotate the polarization of the second modulated light signal such that it is substantially orthogonal to the polarization of the first modulated light signal prior to combining.

30 Claims, 14 Drawing Sheets

(51) Int. Cl.
*H04B 10/532* (2013.01)
*H04B 10/61* (2013.01)
*G02B 6/27* (2006.01)
*G02B 6/42* (2006.01)

(52) U.S. Cl.
CPC ......... *G02B 6/4213* (2013.01); *G02B 6/4214* (2013.01); *H04B 10/532* (2013.01); *H04B 10/614* (2013.01); *G02F 2203/48* (2013.01)

(58) Field of Classification Search
CPC   H04B 10/40; H04B 10/564; H04B 10/50577; H04B 10/541; H04B 10/548
USPC ....... 398/183, 184, 188, 192, 193, 194, 195, 398/200, 201, 135, 136, 138, 158, 159, 398/33, 38, 65, 152, 202, 208
See application file for complete search history.

(56) References Cited

U.S. PATENT DOCUMENTS

| | | | |
|---|---|---|---|
| 3,338,656 | A | 8/1967 | Astheimer |
| 3,677,621 | A | 7/1972 | Smith |
| 4,431,258 | A | 2/1984 | Fye |
| 4,485,405 | A | 11/1984 | Bailey |
| 4,516,837 | A | 5/1985 | Soref et al. |
| 4,844,584 | A | 7/1989 | Miyagawa |
| 6,819,872 | B2 * | 11/2004 | Farries ................. G02B 6/2861 398/102 |
| 8,526,102 | B2 | 9/2013 | Inoue et al. |
| 9,059,805 | B2 * | 6/2015 | Mak ................... H04B 10/5055 |
| 2002/0141463 | A1 | 10/2002 | Bruun-Larsen et al. |
| 2003/0165304 | A1 | 9/2003 | Ohm |
| 2004/0046941 | A1 | 3/2004 | Yamamoto |
| 2004/0179785 | A1 | 9/2004 | Komiya et al. |
| 2007/0116405 | A1 | 5/2007 | Kane et al. |
| 2011/0158576 | A1 | 6/2011 | Kissa et al. |
| 2012/0251119 | A1 | 10/2012 | McNicol et al. |
| 2013/0003022 | A1 | 1/2013 | Tanaka et al. |
| 2013/0128907 | A1 | 5/2013 | Hsieh |
| 2013/0308188 | A1 | 11/2013 | Ono et al. |
| 2014/0071531 | A1 | 3/2014 | Matiss et al. |
| 2015/0311976 | A1 * | 10/2015 | Ishizaka ............. H04B 10/2503 398/38 |

FOREIGN PATENT DOCUMENTS

| | | |
|---|---|---|
| DE | 195 06 894 A1 | 8/1996 |
| EP | 0 368 335 A2 | 5/1990 |
| EP | 2 487 814 A1 | 8/2012 |
| KR | 10-0304621 B1 | 7/2001 |
| WO | WO 2009/054541 A2 | 4/2009 |
| WO | WO 2010/127694 A1 | 11/2010 |

OTHER PUBLICATIONS

Dong, P., et al., "112-Gb/s monolithic PDM-QPSK modulator in silicon," Optic Express B624, vol. 20, No. 26, XP002738989, Dec. 10, 2012, 6 Pages.

Intellectual Property Office of the United Kingdom, Patents Act 1977: Search Report under Section 17(5) for Application No. GB1404603.1, Sep. 4, 2014, 5 Pages.

Intellectual Property Office of the United Kingdom, Patents Act 1977: Search Report under Section 17(5) for Application No. GB1404603.1 (Search for Claims 7-12 and 13-40), May 13, 2015, 3 Pages.

Intellectual Property Office of the United Kingdom, Patents Act 1977: Search Report under Section 17(5) for Application No. GB1404603.1 (Search for Claims 41-43), May 13, 2015, 3 Pages.

Intellectual Property Office of the United Kingdom, Patents Act 1977: Search Report under Section 17(5) for Application No. GB1404603.1 (Search for Claims 44 Partial and 45-49), May 13, 2015, 3 Pages.

Intellectual Property Office of the United Kingdom, Patents Act 1977: Search Report under Section 17(5) for Application No. GB1404603.1 (Search for Claims 50-55), May 13, 2015, 4 Pages.

Patent Cooperation Treaty, International Search Report, International Patent Application No. PCT/EP2015/054568, Jul. 28, 2015, 5 Pages.

Patent Cooperation Treaty, Written Opinion of the International Searching Authority, International Patent Application No. No. PCT/EP2015/054568, Jul. 28, 2015, 11 Pages.

Reidenback, H.D., et al., "An optical directional coupling device with variable coupling," Optics and Laser Technology, Jun. 1976, pp. 109-112.

Schineller, E.R., "Variable Optical Double Prism Attenuator with Multi-Wavelength Spacing," Proceedings of the Symposium on Quasi-Optics, Brooklyn, NY, 1964, pp. 517-533.

Union Optic, Optical Element Catalogue, Mar. 6, 2012, downloaded from the internet at <http://www.u-optic.com/upfiles/pdf/UO_Optical_Element_EN_6.0.pdf> on May 11, 2014, 3 Pages.

* cited by examiner

OPTICAL COMPONENT

RELATED APPLICATIONS

This application is a 35 U.S.C. 371 national stage filing of International Application No. PCT/EP2015/054568, filed on Mar. 5, 2015, which claims priority from United Kingdom Application No. GB1404603.1 filed on Mar. 14, 2014, which subsequently issued as United Kingdom Patent No. GB2522082B on Feb. 24, 2016. The contents of the aforementioned applications are hereby incorporated by reference in their entirety.

TECHNICAL FIELD

The invention relates to optical components. More specifically, the invention relates to, but need not be limited to, optical components for coherent transmitters, receivers and/or transceivers.

BACKGROUND

In this specification the term "light" will be used in the sense that it is used in optical systems to mean not just visible light, but also electromagnetic radiation having a wavelength outside that of the visible range.

Design criteria for optical components are moving towards smaller size and greater functionality. In general, this has led towards greater integration of components. In particular, increasingly the functionality of optical chips made in materials such as silicon, silicon dioxide, indium phosphide and gallium arsenide has enabled the creation of multi-functional and small devices such as optical transmitters and modulators.

However, there remain disadvantages of complete chip integration: the cost of yield impairment, significant optical losses and the reduced manufacturing flexibility of one chip one product.

At the other end of the scale, the cost and complexity of assembling, aligning and fixing multiple optical components in a complex optical device remains a challenge. The accurate alignment of optics in multi-component modules may presently take many hours per module.

Optical transmitters and receivers for high data rates have been enabled by coherent technologies. Today 100 Gb/s and/or higher line rates utilise higher order amplitude and phase modulation, polarization multiplexing, coherent detection and sophisticated digital signal processing techniques. In a typical Dual Polarization Quadrature Phase Shift Key (DP-QPSK) implementation, for example, a 100 Gb/s line rate can be generated from a 25 GHz clock/data rate using high speed digital to analogue converters (DAC) and a pair of QPSK Mach Zehnder modulators (MZM). The data is effectively encoded on two phase and two polarization states of an input laser carrier. Similarly, the encoded data can be extracted at the receiver by polarisation de-multiplexing & coherent detection techniques. In Quadrature Amplitude Modulation (QAM) implementations, both amplitude and phase states with polarization are utilised to increase the line rate.

Transmitters and receivers are typically co-located in a system and are often co-packaged to make transceivers. A laser carrier source can be either integrated into the transmitter (monolithically or as a separate chip) or can be located nearby in an independently packaged device configured to supply an input light signal to the system. In a coherent detection scheme the coherent receiver generally requires the input of a local oscillator (LO) laser reference to extract the QPSK encoded data. The LO source can be derived from an independent laser but for the purposes of efficiency, is typically derived by splitting the input light signal that is provided by the laser source.

A basic coherent transmitter consists of a tunable laser source (carrier) providing an input light signal, Mach-Zehnder interferometers (modulators) and a polarisation combiner to create a composite signal for transmission. The transmitter may be a III-V chip with varying levels of functional integration. The tunable laser may also provide a LO signal for an adjacent receiver operating at the same wavelength or a close wavelength to the transmitter.

In order to create an efficient transmitter module from discrete parts including modulator chips, input fibres and an independent laser, the input light signal is split to supply an optical signal to the receiver LO as well as to the modulators. In addition, an output signal from the modulator chip has to be transformed into its orthogonal polarisation and then the orthogonally polarised light signals output from the transmitter must be combined to give the output signal.

A basic coherent receiver configuration consists of a LO, polarization splitter, a pair of 3 decibel (dB) hybrid mixers and an array of balanced detectors. The receiver may be a III-V chip with varying levels of functional integration.

In addition to the basic functionality mentioned above, both the transmitter and receiver typically require a means to adjust signal levels and a means to control signal levels in the form of a variable optical attenuators and optical monitors respectively.

A coherent receiver where many functions are contained on one chip is described in U.S. Pat. No. 8,526,102. Such a large and complex chip suffers from the disadvantages described herein.

Similarly, where the level of chip integration is limited then the remaining functions are provided by conventional optics where each component in the optical train is put in place and optically aligned individually.

SUMMARY

According to the invention in a first aspect, there is provided an integrated optics block for use in a coherent optical transmitter, the optics block comprising: a beam splitter configured to receive an input light signal, to split the input light signal into first and second input light signals, to output the first input light signal for use in an optical transmitter chip and to output the second input light signal for use as a local oscillator signal; a polarisation combiner configured to receive first and second modulated light signals from an optical transmitter chip and to combine the first and second modulated light signals to form an output; and a polarisation rotator configured to rotate the polarisation of the second modulated light signal such that it is substantially orthogonal to the polarisation of the first modulated light signal prior to combining.

Optionally, the beam splitter comprises a prism.

Optionally, a surface of the prism through which the first input light signal passes, abuts a surface of the polarisation combiner, and wherein the first input light signal passes through the polarisation combiner before output to an optical transmitter chip.

Optionally, the polarisation combiner is configured to receive the first modulated light signal and pass the first modulated light signal directly to a signal output.

Optionally, the polarisation rotator abuts a surface of the polarisation combiner and is configured to rotate the polarisation of the second modulated light signal prior to entry into the polarisation combiner.

Optionally, the first and second modulated light signals are spatially separated, and wherein the polarisation combiner is configured to direct the second modulated light signal to be aligned with the first modulated light signal for combination.

According to the invention in a second aspect, there is provided an integrated optics block for use in a coherent optical receiver, the optics block comprising: a polarisation splitter configured to receive a modulated light signal and split the modulated light signal into a first component of the modulated light signal and having a first polarisation and a second component of the modulated light signal having a second polarisation substantially orthogonally to the first polarisation; and a polarisation rotator for rotating the polarisation of the second component of the modulated light signal by substantially ninety degrees, wherein the polarisation splitter is further configured to direct the second component of the modulated light signal to the polarisation rotator.

Optionally, the integrated optics blocks described above further comprise at least one monitor configured to measure the power of the input light signal out of the optical plane.

Optionally, the at least one monitor is configured to measure the power of one or more modulated light signals out of the optical plane.

Optionally, the monitor comprises a dielectric layer configured to deflect a portion of a light signal to be monitored to a detector.

Optionally, the monitor comprises a PIN diode.

Optionally, the monitor further comprises a micro-lens configured to focus a light signal to be monitored onto the monitor.

Optionally, the integrated optics block further comprises a variable optical attenuator configured to attenuate the power in an optical signal based on at least one optical power measurement.

Optionally, the at least one optical power measurement is provided by the at least one monitor.

Optionally, the variable optical attenuator comprises a dielectric region configured to pass a proportion of a light signal incident on the dielectric layer and to reflect the remaining proportion of the light signal.

Optionally, the dielectric region comprises a gap between two optical transmission components.

Optionally, the gap comprises one of: a vacuum; air; and a dielectric material.

Optionally, the variable optical attenuator comprises first and second prisms separated by the dielectric region.

Optionally, the variable optical attenuator comprises a control mechanism configured to alter the interface to vary the proportion of the light signal that passes through.

Optionally, at least part of the control mechanism is connected to a surface of the variable optical attenuator such that deflection thereof alters the interface, and wherein the control mechanism comprises one of: a thermally controlled bi-metallic strip; and a piezo-electric element.

Optionally, the variable optical attenuator is configured to operate as an optical shutter.

Optionally, the integrated optics block further comprises an alignment trimmer configured to alter a direction of one or more light signals propagating through the optics block for mitigating misalignment of one or more elements of the optics block.

Optionally, the alignment trimmer comprises a dielectric layer configured to reflect light having a first polarisation and to pass light having a second polarisation orthogonal to the first polarisation, and further comprising at least one polarisation rotating mirror configured to reflect light signals such that the reflected light signal has its polarisation rotated by substantially ninety degrees and arranged to receive a reflected light signal from the dielectric layer and to alter an angle of the reflected light signal.

Optionally, the alignment trimmer further comprises first and second prisms separated by the dielectric layer.

Optionally, the alignment trimmer further comprises first and second polarisation rotating mirrors on opposing surfaces of the alignment trimmer, wherein the first polarisation rotating mirror is configured to receive a first light signal having a first polarisation that has entered the alignment trimmer and been reflected from the dielectric layer and to reflect the first light signal to produce a second light signal having a second polarisation substantially orthogonal to the first polarisation, such that the second light signal may pass through the dielectric layer, and wherein the second polarisation rotating mirror is configured to receive the second light signal and to reflect the second light signal to produce a third light signal having the first polarisation, such that the third light signal is reflected by the dielectric layer and exits the alignment trimmer, and wherein one or both of the first and second polarisation rotating mirrors is aligned such that the third light signal exits the alignment trimmer at a different angle to the angle that the first light signal entered the alignment trimmer.

Optionally, the at least one polarisation rotating mirror is held in place by an adhesive and may be set to a desired alignment before the adhesive is cured.

Optionally, the at least one polarisation rotating mirror comprises a curved reflecting surface.

Optionally, the alignment trimmer further comprises an optical transmission block between the at least one polarisation rotating mirror and a corresponding surface of the alignment trimmer.

Optionally, the alignment trimmer comprises a transmissive optical element comprising first and second internal facets and at least one mirror, wherein the alignment trimmer is configured to reflect a received light signal off the first internal facet, off the at least one mirror and the second internal facet to be output from the alignment trimmer at an angle determined by an alignment of the mirror.

Optionally, the integrated optics block further comprises a pitch transformer configured to control the pitch between light signals output from and input to the optics block, the pitch transformer comprising: a transmissive optical element comprising opposed substantially parallel surfaces arranged to be angled with respect to a direction of a received light signal, wherein the opposed surfaces are configured such that a received light signal is reflected from each of the opposed surfaces and is output from the pitch transformer substantially parallel to and offset from the direction of the received light signal.

Optionally, the integrated optics block comprises a plurality of pitch adjusters arranged to provide a plurality of outputs and/or inputs and having a common pitch of substantially 250 micrometers.

According to the invention in a third aspect, there is provided an optical component comprising one or more integrated optics blocks described above.

According to the invention in a fourth aspect, there is provided a coherent optical transmitter and/or receiver device comprising one or more integrated optics blocks described above.

Optionally, the coherent optical transmitter and/or receiver comprises one or more optical chips, wherein the one or more integrated optics blocks is arranged to emit light signals to and receive light signals from the one or more optical chips.

Optionally, the one or more optical chips comprises an optical chip comprising a plurality of optical transmitters, a plurality of optical receivers or at least one optical transmitter and at least one optical receiver.

Optionally, the coherent optical transmitter and/or receiver further comprises one or more arrays of lenses positioned between the one or more integrated optics blocks and the one or more optical chips, wherein a plurality of lenses in the array of lenses is configured to focus light passing between the integrated optics block and the optical chip.

Optionally, the coherent optical transmitter and/or receiver comprises a plurality of optical transmitter chips and/or optical receiver chips, wherein the integrated optics block is arranged to emit light signals to and receive light signals from one of the plurality of optical transmitter chips and/or optical receiver chips.

Optionally, the coherent optical transmitter and/or receiver comprises a plurality of integrated optics blocks arranged to form a single monolithic structure.

Optionally, the one or more optics blocks are configured to receive an input light signal from a direction transverse to a direction of light signals entering and exiting the one or more optical chips.

Optionally, the coherent optical transmitter and/or receiver further comprises one or more tunable lasers configured to provide an input light signal to the one or more optics blocks.

According to the invention in a fifth aspect, there is provided a monitor for monitoring power of a light signal, the monitor comprising: a dielectric layer for placing in an optical plane of a light signal to be monitored; and a detector configured to be out of the optical plane of the light signal to be monitored when the dielectric layer is in the optical plane of a light signal to be monitored, wherein the dielectric layer is configured to deflect a proportion of the light signal to be monitored to the detector.

Optionally, the monitor further comprises first and second prisms arranged such that the dielectric layer separates a surface of the first prism and a surface of the second prism to form an interface.

Optionally, the monitor comprises a PIN diode.

According to the invention in a sixth aspect, there is provided a variable optical attenuator for controlling an attenuation of a light signal, the variable optical attenuator comprising: a dielectric region configured to pass a proportion of a light signal incident on the dielectric layer and to reflect the remaining proportion of the light signal; and a control mechanism configured to alter the interface to vary the proportion of the light signal that passes through.

Optionally, the variable optical attenuator comprises first and second prisms separated by the dielectric region.

Optionally, the dielectric region comprises a gap between two optical transmission components.

Optionally, the gap comprises one of: a vacuum; air; and a dielectric material.

Optionally, at least part of the control mechanism is connected to a surface of the variable optical attenuator such that deflection thereof alters the interface, and wherein the control mechanism comprises one of: a thermally controlled bi-metallic strip; and a piezo-electric element.

Optionally, the variable optical attenuator is configured to operate as an optical shutter.

According to the invention in a seventh aspect, there is provided an alignment trimmer for altering a direction of one or more light signals, the alignment trimmer comprising: a dielectric layer configured to reflect light having a first polarisation and to pass light having a second polarisation orthogonal to the first polarisation; and at least one polarisation rotating mirror configured to reflect light signals such that the reflected light signal has its polarisation rotated by substantially ninety degrees, wherein the at least one polarisation mirror is arranged to receive a reflected light signal from the dielectric layer and to alter an angle of the reflected light signal.

Optionally, the alignment trimmer further comprises first and second prisms separated by the dielectric layer.

Optionally, the alignment trimmer comprises first and second polarisation rotating mirrors on opposing surfaces of the alignment trimmer, wherein the first polarisation rotating mirror is configured to receive a first light signal having a first polarisation that has entered the alignment trimmer and been reflected from the dielectric layer and to reflect the first light signal to produce a second light signal having a second polarisation substantially orthogonal to the first polarisation, such that the second light signal may pass through the dielectric layer, and wherein the second polarisation rotating mirror is configured to receive the second light signal and to reflect the second light signal to produce a third light signal having the first polarisation, such that the third light signal is reflected by the dielectric layer and exits the alignment trimmer, and wherein one or both of the first and second polarisation rotating mirrors is aligned such that the third light signal exits the alignment trimmer at a different angle to the angle that the first light signal entered the alignment trimmer.

Optionally, the at least one polarisation rotating mirror is held in place by an adhesive and may be set to a desired alignment before the adhesive is cured.

Optionally, the at least one polarisation rotating mirror comprises a concave or convex reflecting surface.

Optionally, the alignment trimmer further comprises an optical transmission block between the at least one polarisation rotating mirror and a corresponding surface of the alignment trimmer.

According to the invention in a eighth aspect, there is provided an alignment trimmer for altering a direction of one or more light signals, the alignment trimmer comprising: a transmissive optical element comprising first and second internal facets; and at least one mirror, wherein the alignment trimmer is configured to reflect a received light signal off the first internal facet, off the at least one mirror and the second internal facet to be output from the alignment trimmer at an angle determined by an alignment of the mirror.

Optionally, the at least one mirror is held in place by an adhesive and may be set to a desired alignment before the adhesive is cured.

Optionally, the at least one mirror comprises a curved reflecting surface.

Optionally, the alignment trimmer further comprises an optical transmission block between the at least one mirror and a corresponding surface of the alignment trimmer.

BRIEF DESCRIPTION OF THE DRAWINGS

Exemplary embodiments of the invention are disclosed herein with reference to the accompanying drawings, in which.

DESCRIPTION

Figure 1:
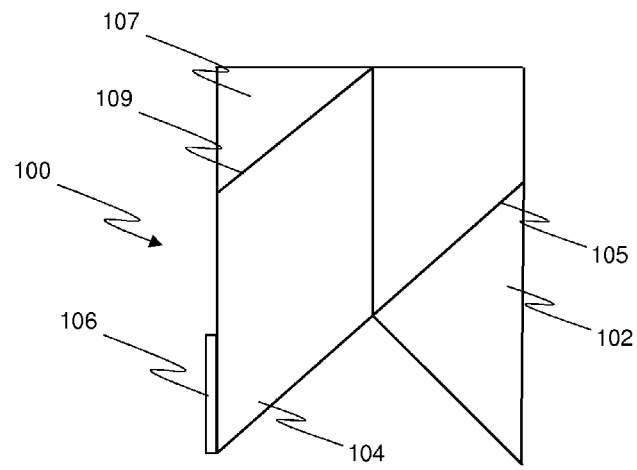
FIG. 1 is a schematic representation of an integrated optics block.

Generally, disclosed herein is an integrated optics block for use in coherent optical transmitters, receivers and/or transceivers. As used herein, the term "integrated optics block" encompasses a plurality of optical components placed together such that surfaces of each component abut to form a single integrated, monolithic block. The optical components are specifically configured so as to be placed together such that surfaces of each component abut to form a single integrated block. This is distinct from discrete optical arrangements, in which optical components are placed apart from one another.

Commonly, the plurality of optical components may comprise optical transmission blocks and interfaces (e.g. dielectrics) that are bonded together in a monolithic block. Such an arrangement allows the plurality of components to be assembled as a sub-assembly without reference to the rest of the assembly and also allows mating surfaces (or interfaces) to be used to improve the alignment precision between the plurality of optical components.

An integrated optics block may comprise films and interfaces embedded in the block at interfaces between optical components and/or on the surface of the block. The interfaces may be set at appropriate angles to process light beams passing through the integrated optics block.

The inventors have appreciated that developments in micro-optic fabrication of functional blocks and lens arrays have led to such components being manufactured to tighter tolerances, making integration possible. This may be exploited to enable discrete functional elements to be integrated into a high level functional block.

The inventors have also appreciated that any residual misalignment due to manufacturing tolerances can be mitigated by incorporating novel alignment correction structures, which may be incorporated into the same integrated optics block.

Further, the inventors have appreciated that control and monitoring of light signals within an optical component may be provided out of the optical plane.

The use of an integrated optics block and/or out of plane control, monitoring and trimming provides advantages in alignment time and costs of manufacturing devices comprising optical chips such as PLCs integrated with other optical functions. Out of plane monitoring, trimming and variable optical attenuation enables efficient scalability at a product level by abutting a plurality of integrated optics blocks.

Disclosed herein are optical components providing inputs and outputs from the same side of an optical chip. The use of a single-sided chip enables simpler and cheaper manufacture since only one side of the chip needs to be aligned and additionally it allows for a more compact overall module design.

Disclosed herein are integrated or monolithic optics blocks to fulfil multiple optical functions when aligned with an optical chip, such as an optical transmitter, receiver or transceiver chip. Also disclosed herein are such integrated or monolithic optics blocks providing simple and cheap optical alignment with the optical chip and output ports or fibres. A further advantage of the methods and apparatus disclosed is that multiple chips and multi-functional chips can be conveniently aligned and packaged together.

FIG. 1 shows an integrated optics block 100 for use in a coherent optical transmitter. The optics block 100 comprises a plurality of optical transmission blocks, which may be manufactured comprising glass. The optical transmission blocks are placed together to form a structure that appears monolithic from the outside. There may be one or more air gaps between optical transmission blocks that form an integrated optics block. Such air gaps may form interfaces arranged to affect the transmission of light therethrough.

The integrated optics block 100 comprises a beam splitter 102, a polarisation combiner 104 and a polarisation rotator 106. The beam splitter 102 may be a prism configured to receive an input light signal, allow a proportion of that signal to pass through and to reflect a proportion for output as an LO signal. The proportion of the input light signal that passes through the beam splitter 102 also passes through the polarisation combiner 104 and is output for use in an optical transmitter chip (shown in FIG. 2).

The polarisation combiner 104 is configured to receive spatially separated modulated light signals from the optical transmitter chip. The polarisation combiner 104 is further configured to combine the spatially separated modulated light signals to form an output signal for the coherent transmitter.

The polarisation rotator 106 is configured to rotate the polarisation of one of the modulated light signals by substantially ninety degrees. The polarisation rotator 106 abuts an outer surface of the polarisation combiner 104. The polarisation rotator 106 may be a half wave plate. A surface of the beam splitter 102 abuts a surface of the polarisation combiner 104. An interface 105 comprises a dielectric region, which may comprise a vacuum, an air gap or a stack of dielectric materials. The interface 105 may form part of the beam splitter 102. In addition, a prism 107 is bonded to a surface of the polarisation combiner 104. A second interface 109 comprises a dielectric region, which may comprise a vacuum, an air gap or a stack of dielectric materials. The second interface 109 may form part of the prism 107.

Accordingly, the elements of the optics block 100 are arranged together such that they are integrated. The elements of the optics block 100 may be held together by an optically transmissive bonding agent, such as a commercially available UV activated polymer transmissive over the wavelengths of interest.

Figure 2:
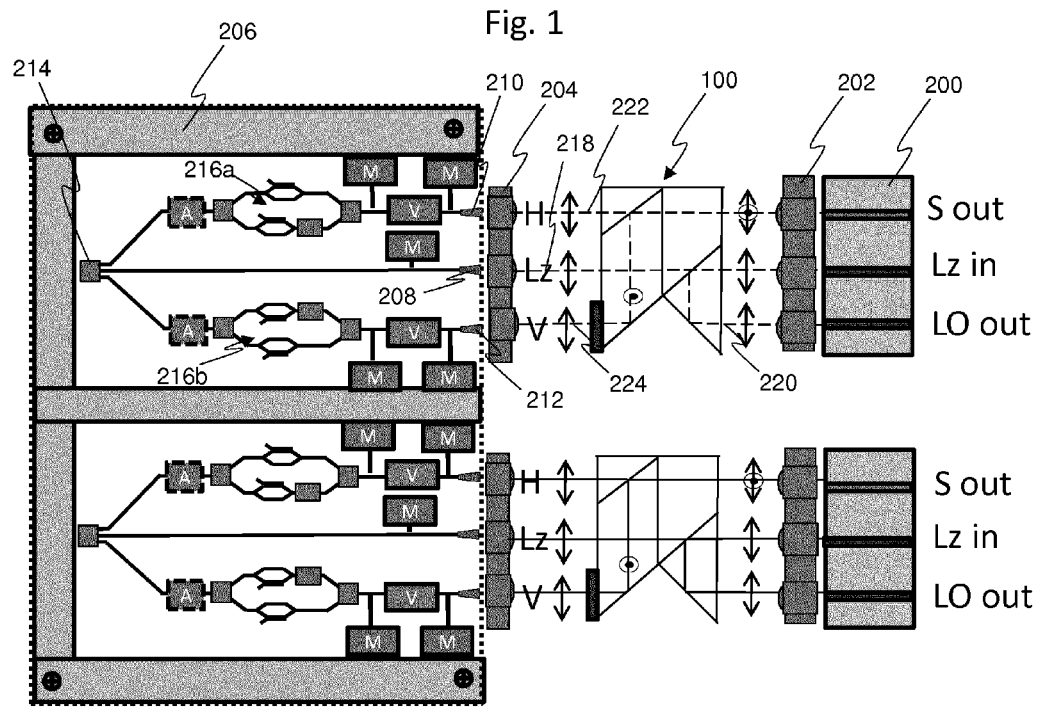
FIGS. 2, 3, 4a, 4b, 6, 8, 11, 15 and 16 are schematic representations of coherent optical transmitters.

FIG. 2 shows the optics block 100 in a coherent transmitter arrangement. The coherent transmitter also comprises an input/output fibre array 200, an input/output micro-lens array 202, a transmitter micro-lens array 204 and an optical transmitter chip 206. FIG. 2 shows two coherent transmitters arranged adjacent to each other. The second coherent transmitter comprises similar features to those of the first coherent transmitter and so is not discussed in detail here.

The micro-lens arrays 202, 204 comprise a plurality of micro-lenses arranged in an array and having a constant pitch. The pitch may, for example, be 250 micrometers.

In the arrangement of FIG. 2, each of the micro-lens arrays 202, 204 has three micro-lenses configured to focus light signals into and from the integrated optics block 100.

The optical transmitter chip 206 comprises a signal input port 208 and horizontal and vertical output ports 210, 212. The input port 208 is in optical communication with a return or reflect device 214 configured to split an input light signal into two halves that are reflected back through the optical transmitter chip 206. The return or reflect device 214 is in optical communication with two Mach Zehnder (MZ) modulators 216a, 216b, which are each in optical communication with one of the horizontal output port 210 and the vertical output port 212. The optical transmitter chip may also comprise one or more monitors for monitoring the power of the light signals within the optical transmitter chip.

FIG. 2 shows a light path, which is represented by a dashed line, through the integrated optics block 100. A laser input light signal Lz, which may have a tunable laser as its source and is horizontally (H or TE) polarised, passes through the input/output fibre array 200 and the input/output micro-lens array. The laser input light signal is received by the beam splitter 102 and is split into first and second input beams 218, 220. The first and second input light signals 218, 220 each represent a proportion of the laser input light signal. In exemplary apparatus, the second input light signal may comprise half the optical power (or 3 dB) of the first input light signal.

The first input light signal 218 passes through the beam splitter 102 and the polarisation combiner 104 and enters the transmitter lens array 204 and is focussed into the signal input port 208. The second input light signal 220 is reflected by the beam splitter and directed out of the coherent transmitter for use as a LO signal. The second input light signal is therefore directed back through the input/output lens array 202 and the input/output fibre array 200 to the LO out port. for the local receiver operating at the same wavelength.

The first input light signal 218 is launched into a waveguide, which may be a central waveguide, of the optical transmitter chip 206 through which it propagates to the return or reflector device 214. Optionally, the power of the first input light signal 218 may be monitored by a monitor on the chip 206. The first input light signal 218 is split approximately 50:50 into an H channel and a V channel so that each of the MZ modulators 216a, 216b receives a beam of tunable laser light.

The optical transmitter chip 206 may be an indium phosphide (InP) chip. Optional features on the chip include semiconductor optical amplifiers (SOA), beam splitters, and variable optical attenuators.

The H and V channel input light signals are modulated by the MZ modulators 216a, 216b and the modulated H and V light signals are transmitted to the H and V output ports 210, 212, through the transmitter lens array 204 and into the optics block 100. Optionally, monitors on the optical transmitter chip may monitor the power of the modulated H and V channel modulated light signals.

The H channel modulated light signal 222 is received by the polarisation combiner 104 and is transmitted directly through it, the input/output lens array and the input output fibre array 200 to a signal output port $S_{out}$. The V channel modulated light signal 224 is received by the polarisation rotator 206 and has its polarisation rotated by 90 degrees to become vertically polarised (V or TM). The V channel modulated light signal 224 is reflected off an outer facet of the polarisation combiner 104 and is combined with the H channel modulated light signal 222 and transmitted to the signal output port $S_{out}$.

The light signals 218, 222, 224 may be equally spaced apart, the spacing being approximately 250 micrometers or some multiple of a fixed spacing. Optionally, the light signals 218, 222, 224 are focussed at the chip waveguide facets using the transmitter micro-lenses 204 and these lenses may be in the form of an array of a given pitch (e.g. 250 micrometers). The light signals 218, 222, 224 may be focussed into the fibres of the input/output fibre array 200 by the array of input/output micro-lenses 202. The micro-lenses 202, 204 may be made of silicon, glass or other suitable wafer-scale process material.

Figure 3:
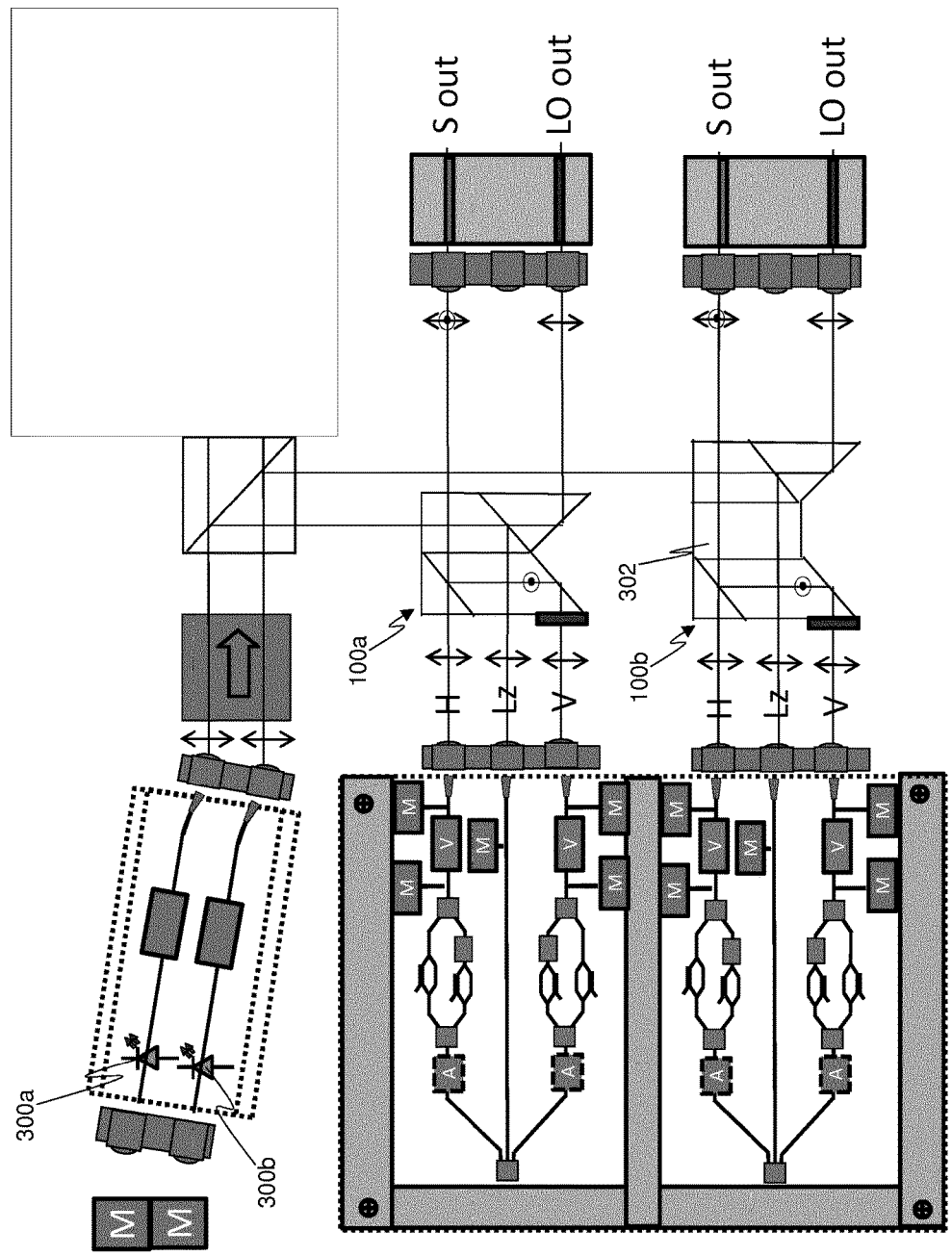

FIG. 3 shows an alternative arrangement in which the tunable laser input signal Lz may be provided from one side of the coherent transmitter. This arrangement may be used, for example, where the tunable laser or lasers are included within the same package as the coherent transmitter. Multiple tunable lasers 300, 302 may be provided in an array to provide tunable laser input signals to first and second beam splitters 100a, 100b. Each of the beam splitters 100a, 100b is arranged to receive light from one side from one of the lasers 300a, 300b and to send a proportion of each laser input signal to the transmitter and reflect a proportion as an LO out beam, as discussed above.

The optics blocks 100a, 100b may be arranged such that each can receive a laser input signal from one of the lasers 300a, 300b in the same plane without cross-talk or interference. In the exemplary arrangement of FIG. 3, this is provided by the introduction of one or more stepping or spacer blocks 302 introduced into one of the optics blocks 100b. Alternatively, the optics blocks 100a, 100b may be staggered or stepped either in the vertical plane or the horizontal plane. In this case the micro-lens arrays may be used as before but one lens in the output array remains unused, as shown in FIG. 3.

Figure 4A:
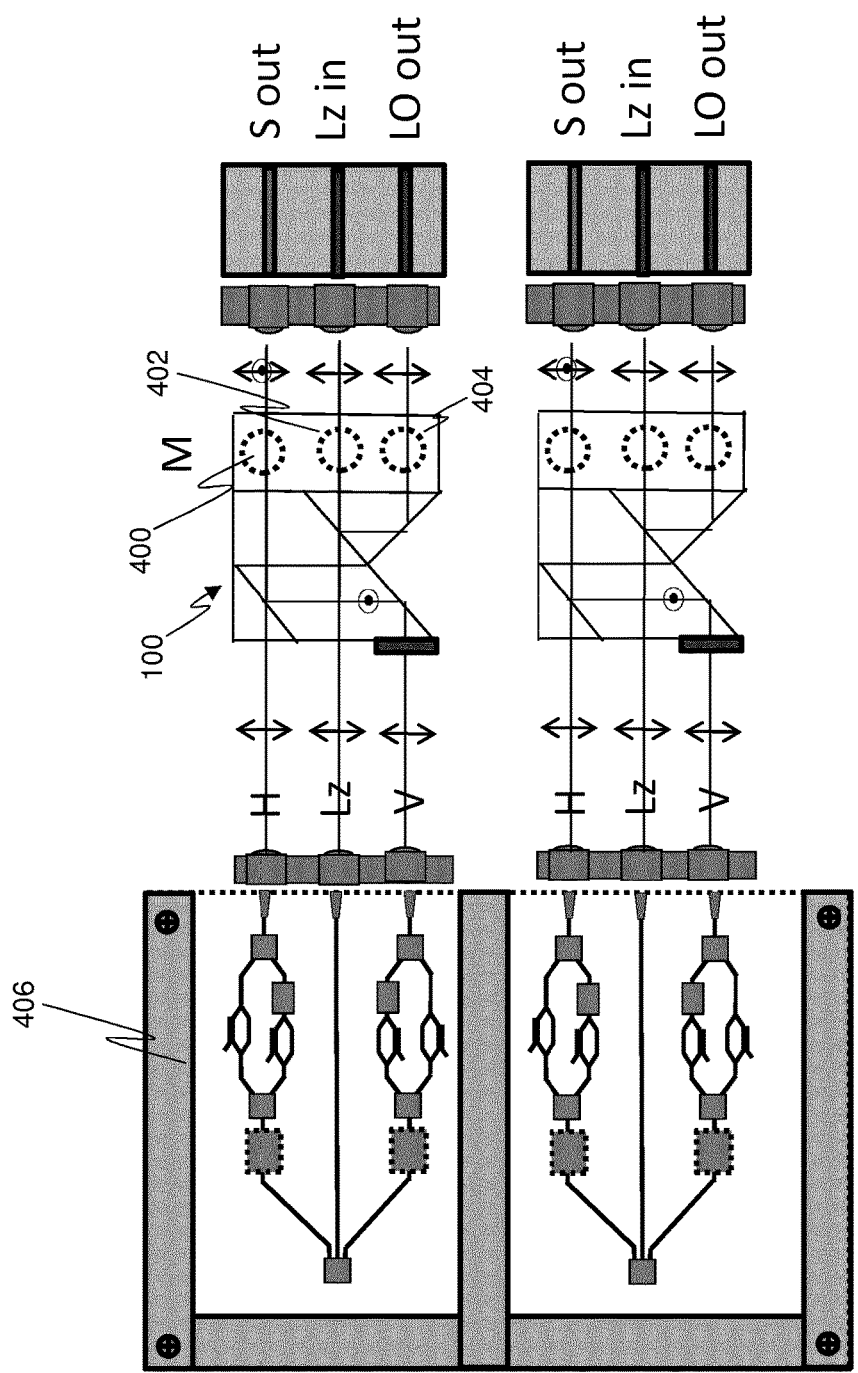

FIG. 4a shows a coherent optical transmitter arrangement comprising an integrated optical block 100. The integrated optical block 100 also comprises a plurality of monitors 400, 402, 404. The monitors may therefore be removed from the optical transmitter chip 406 and included as part of the integrated optics block 100. The remaining features of the coherent transmitter of FIG. 4a are similar to those in FIG. 1 and are not discussed in detail again.

The monitors 400, 402, 404 may be out of the optical plane of the optics block 100. In FIG. 4a, the optical plane is coincident with the plane of the drawing and directions into and out of the drawing are considered to be out of the optical plane. Fundamentally, for a feature to be out of the optical plane, it should not be in the path of light signals as they traverse the optics block 100.

Figure 4B:
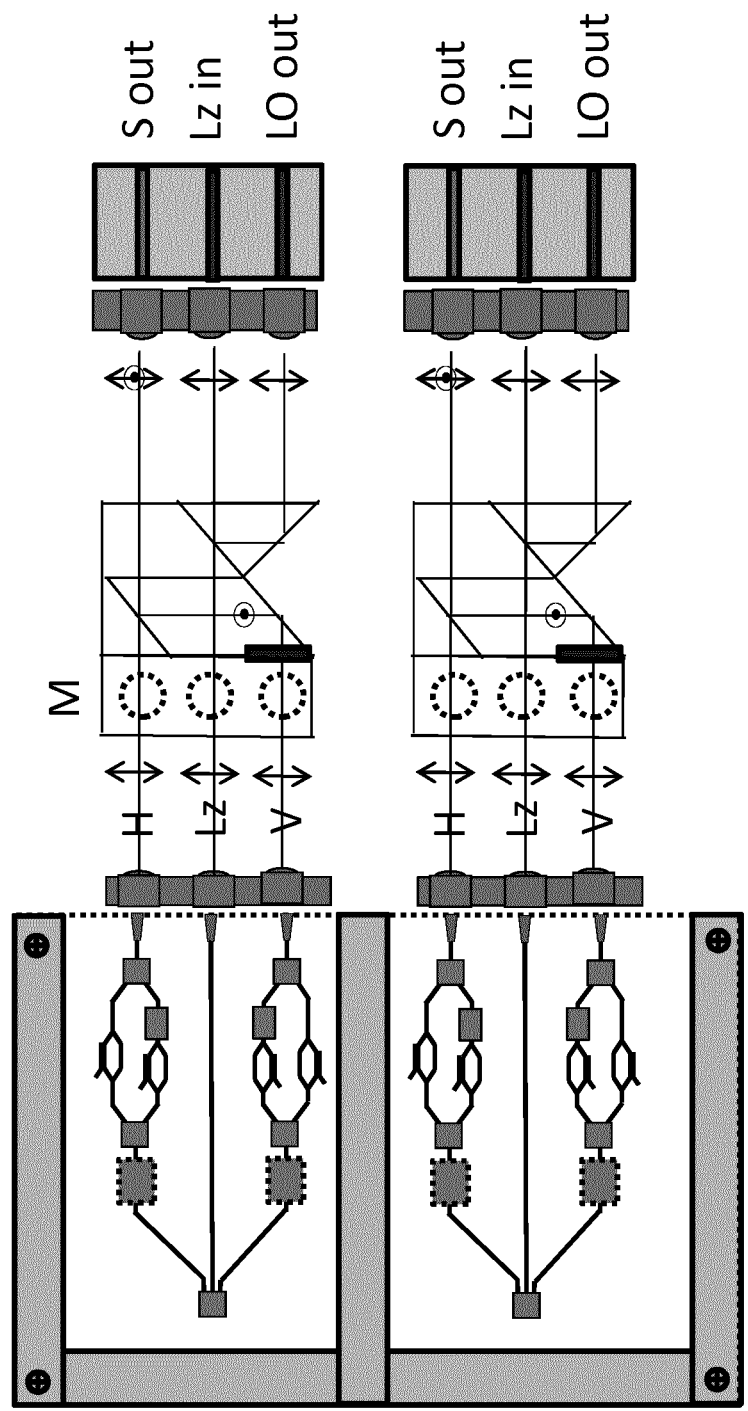

FIG. 4a shows the monitors forming part of the optical optics block on an input/output side. However, the monitors may also form part of the optics block on the optical chip side, as shown in FIG. 4b. In addition, various combinations of input/output and chip side monitoring can be used.

Figure 5:
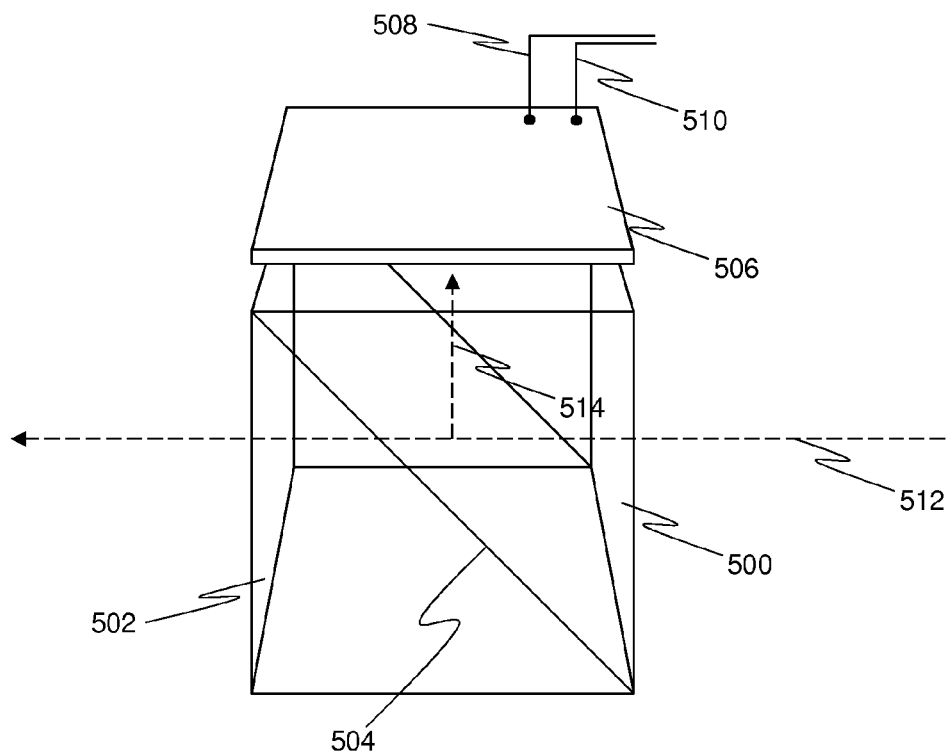
FIG. 5 is a schematic representation of an optical monitor.

A detailed representation of a monitor is shown in FIG. 5. The monitor comprises two right angled triangle prisms 500, 502 and a dielectric layer 504. The prisms 500, 502 are arranged such that a surface of the first prism 500 is separated from a corresponding surface of the second prism 502 by the dielectric region 504. A monitor detector 506 sits above the prism arrangement. The monitor detector 506 may have a fixed orientation with respect to the prism arrangement and may, for example, be held in place by a bonding agent such as epoxy resin. The monitor detector 506 is configured to transduce the light signal into an electrical signal, which may be read from electrical contacts 508, 510. An incoming light signal 512 is split at the dielectric layer 504 giving rise to a vertical light signal 514 representing a proportion of the incoming light signal 512. The proportion may be, for example, approximately 1% of the incoming light signal. The vertical light signal 514 is incident on the monitor detector 506 to monitor the power level of the incoming signal 512. The positioning of the monitor detector 506 enables the incoming signal 512 to be monitored and measured out of the optical plane of the device.

The monitor detector 506 may be manufactured using InGaAs or a similar semiconductor material. The monitor detector 506 may be ready mounted onto a PCB and relatively insensitive to alignment. Such a monitor device could be made with an aperture and beam stop to collect as much as possible of the vertical light signal and minimise cross-talk. The monitor detector 506 may be a high speed PIN diode with a small aperture. The vertical light signal 514 may be focussed on the monitor detector 506 with a micro-lens.

The monitors 400, 402, 404 may be manufactured in a single piece forming part of the integrated optics block 100. Accordingly, the integrated optics block 100 of FIG. 4 provides polarisation rotation, polarisation beam combining, optical carrier beam splitting and out of plane power monitoring.

In exemplary methods and apparatus, a detector area may comprise a plurality of segments or separate areas in a specific geometry to determine the position of the beam for alignment purposes. This would not detract from the power measurement capability.

Figure 6:
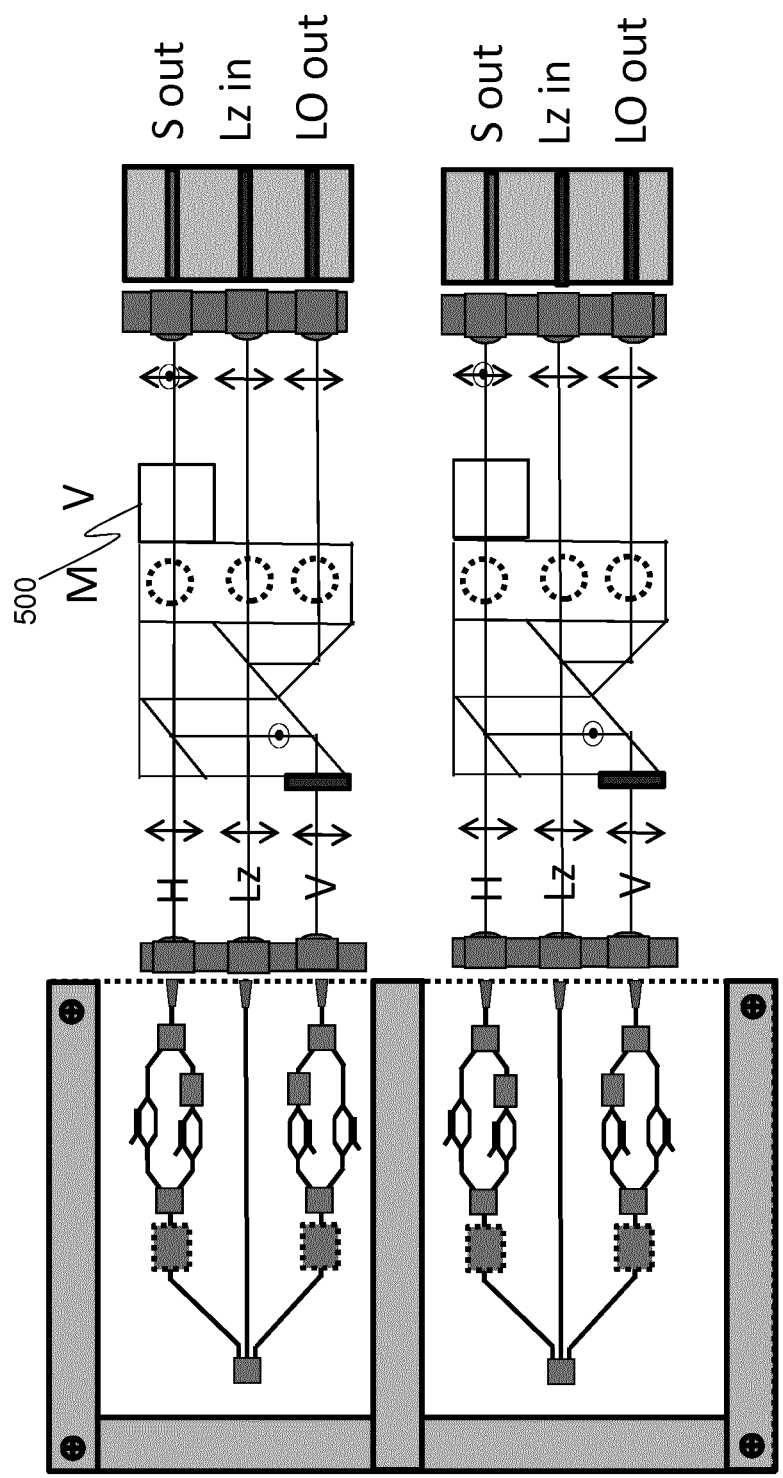

FIG. 6 shows an optical coherent transmitter comprising an optics block 100 additionally comprising a variable optical attenuator (VOA) 500 or optical shutter. FIG. 6 shows a plurality of monitors forming part of the integrated optics block, although these are optional in this embodiment. The remaining features of the coherent transmitter of FIG. 6 are similar to those discussed above and are not discussed again in detail.

Figure 7:
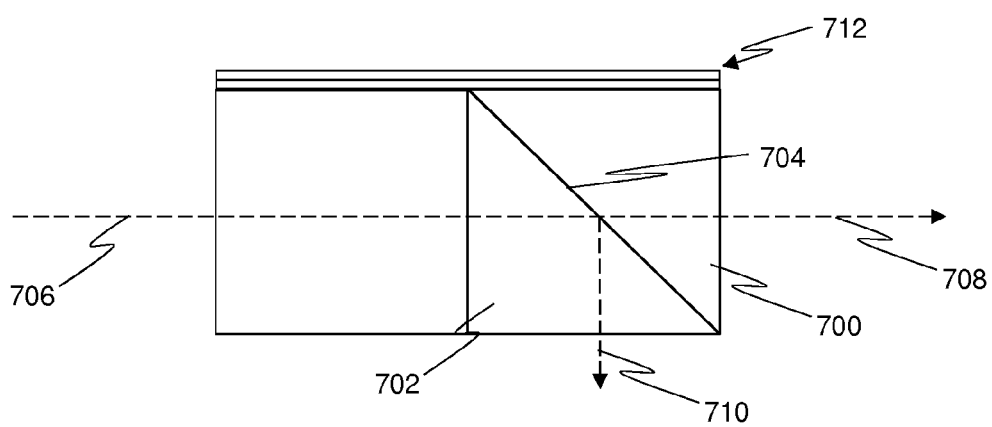
FIG. 7 is a schematic representation of a variable optical attenuator.

A detailed representation of a VOA is shown in FIG. 7. A VOA may generally be operated in closed loop control via a power measurement. The power measurement may be obtained by one or more monitors as disclosed herein. The VOA comprises of two right angled triangle prisms 700, 702 mounted adjacent to each other and separated by a dielectric region forming an interface 704. The dielectric region may comprise a vacuum, an air gap or a dielectric material. An incoming light signal 706 meets the interface 704 is split variably into two light signals 708, 710. The first light signal 708 passes through the VOA and the second light signal 710 is reflected and absorbed or dumped in some way. In this way, the first light signal 708 is an attenuated version of the incoming light signal 706. in exemplary VOAs, at the interface 704 there is a precise and variable gap between the prisms 700, 702 of the order of the wavelength of the light to be attenuated and the thickness of which determines the proportion of light that is either transmitted or reflected.

A control mechanism 712 is configured to control the amount proportion of the incoming light signal 706 that is reflected and absorbed 710. The control mechanism 712 may be a deflectable strip, such as a thermally controlled bi-metallic strip or a piezo-electric actuator. This enables delicate control of the space at the interface 704 and hence the proportion of light deflected out of the optical plane. In exemplary optical transmitters and/or receivers, the device itself is arranged in space so that the prisms 700, 702 lie in the optical plane and the control mechanism 712 and the region of absorption of deflected light are out of the optical plane. However, in other exemplary optical transmitters and/or receivers, there may be advantage in the partially reflected light being deflected to another prism or block in the optical plane.

Optionally, the VOA may be hermetically sealed in order to prevent ingress of particles between the faces of the interface 704. Preferably, the interface 704 may be sealed by a flexible film arranged at the edges of the interface 704. Such a seal would be sufficiently flexible to allow movement as demanded by the controller 712 and would prevent contamination of the interface surfaces. In exemplary methods and apparatus, an optical shutter of various types may be used in place of a VOA.

An optical shutter may be an extension of the VOAs described herein. A shutter action may be defined as an attenuation below a specified limit, for example −60 dB. To do this for the device described herein requires the dielectric region, in this case a gap between the prism surfaces, to be greater than about 3 microns.

Figure 8:
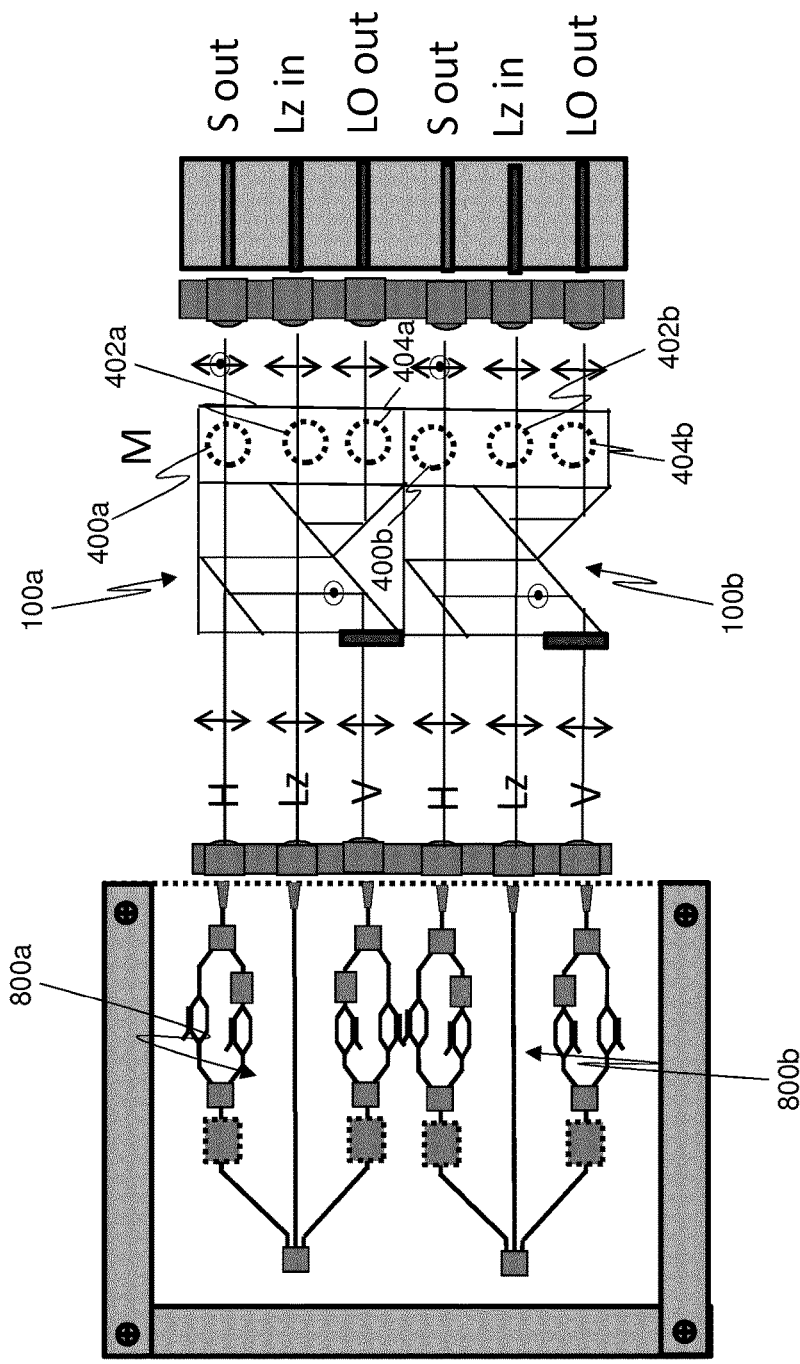

FIG. 8 shows a coherent optical transmitter utilising a constant pitch micro-lens array for two optical transmitter chips 800a, 800b. In the exemplary arrangement of FIG. 8, first and second integrated optics blocks 100a, 100b are placed adjacent one another. This arrangement is made possible because of the out of plane monitoring shown by the monitors 400a, 402a, 404a, 400b, 402b, 404b. In addition, the micro-lens arrays 202, 204 can be seen to have continuous pitch, which may be, for example, 250 micrometers. The coherent optical transmitter may also include one or more VOAs as discussed above. The remainder of the features of the apparatus of FIG. 8 are similar to those discussed above and are not discussed in detail again. It is noted that similar arrangements may be used in which one of the optical chips is a receiver, or where both of the optical chips are receivers.

The arrangement shown in FIG. 8 is a more scalable arrangement in which multi-function optical components may be provided on a smaller scale. The arrangement may be extended to comprise more than two optical chips (optical transmitter chip in the exemplary component of FIG. 8).

Figure 9:
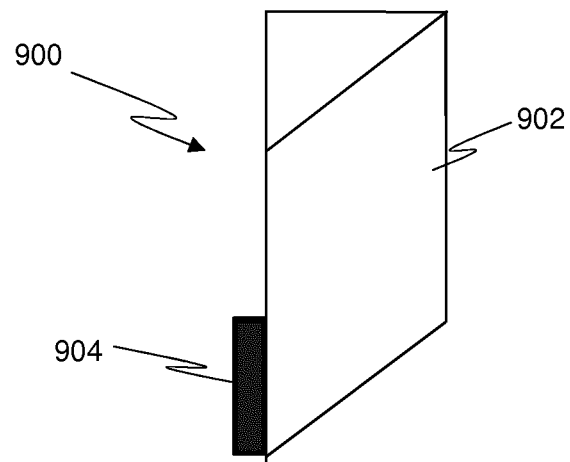
FIG. 9 is a schematic representation of an integrated optics block.

FIG. 9 shows an integrated optics block 900 for use in a coherent optical receiver. The optics block 900 comprises a polarisation splitter 902 and a polarisation rotator 904. The polarisation rotator 904 is configured to rotate the polarisation of a modulated light signal by substantially ninety degrees. The polarisation rotator 904 abuts an outer surface of the polarisation combiner 902. The polarisation rotator 904 may be a half wave plate.

Figure 10:
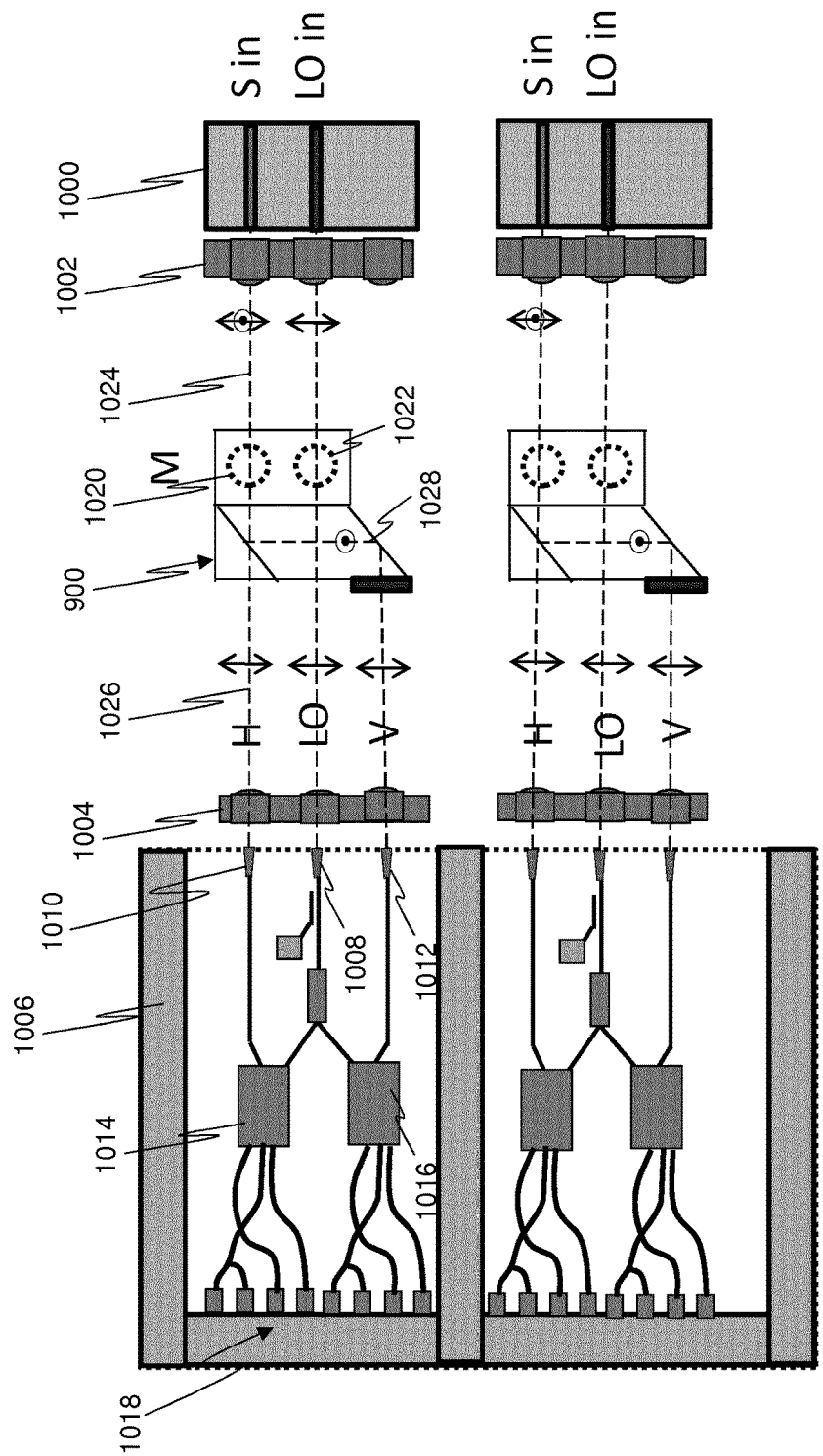
FIG. 10 is a schematic representation of coherent optical receiver.

FIG. 10 shows a coherent optical receiver arrangement comprising the integrated optics block 900. The coherent optical receiver further comprises an input fibre array 1000 and an input micro-lens array 1002. The input fibre array comprises a signal in port $S_{in}$ and a LO in port $LO_{in}$. The LO signal may be provided by a nearby coherent optical transmitter, for example, if the receiver and transmitter form part of a transceiver. The input micro-lens array 1002 is configured to receive light signals from the signal in and LO in ports and focus the light signals into the optics block 900. The coherent optical receiver further comprises a receiver micro-lens array 1004 and an optical receiver chip 1006. The receiver micro-lens array 1004 is configured to receive light signals from the optics block 900 and to focus those light signals into the receiver chip 1006.

The optical receiver chip 1006 comprises a LO input port 1008, an H channel input port 1010 and a V channel input port 1012. The H and V channel input ports 1010, 1012 are in optical communication with H and V channel demodulators 1014, 1016, which may both be 90-degree optical hybrid phase mixers configured to combine the received signal and LO inputs to provide four outputs of equal power to the detectors 1018. The LO input port 1008 is in optical communication with both the H and V channel hybrid mixers 1014, 1016 via a splitter. The H and V channel hybrid mixers are in optical communication with a plurality of detectors 1018.

Optionally, the coherent optical receiver further comprises monitors 1020, 1022, which may be the same as the monitors described above with reference to FIG. 5.

FIG. 10 shows a light path, which is represented by a dashed line, through the integrated optics block 900. An input modulated light signal 1024 is received by the input fibre array 1000 and transmitted through the micro-lens array 1002. The input modulated light signal 1024 is then received by the polarisation splitter 902. The polarisation splitter splits the modulated input light signal into its H polarised component 1026 and V polarised component 1028. The H polarised component 1026 is passed through the polarisation splitter 902 and the V component 1028 is reflected toward the polarisation rotator 904 and is rotated by ninety degrees.

The two resulting H polarised modulated light signals are transmitted through the receiver lens array 1004 and focussed into the H input port 1010 and the V input port 1012 respectively. The modulated light signals are mixed with the LO signal in the hybrid phase mixers 1014 1016 and the outputs are detected at the balanced detectors 1018 on the chip 1006.

The coherent receiver requires the input of a LO at or near the carrier frequency. This is provided by the tunable laser as described above and is connected to the receiver at the LO input port. Similarly to the transmitter arrangements described above, micro-lens arrays may conveniently be employed to focus the beams from the fibre and chip into the block and from the block into the fibre and chip facets. Such micro-lens arrays may have a standard pitch (e.g. 250 micrometers), but other arrangements are possible.

The monitors 1020, 1022 on the optics block 900 are configured to monitor the LO and modulated input light signal 1024. The monitors 1020, 1022 may be manufactured as a single piece. Further, the monitors 1020, 1022, the polarisation splitter 902 and polarisation rotator 904 are manufactured as a single unit to facilitate alignment and manufacture.

Two advantages of integrating optical components into a single micro-optics block 100, 900 include: a reduction in size of a coherent transmitter, receiver or transceiver; and a significant reduction in alignment time during module build. Nevertheless, some alignment or at least trimming of alignment may be necessary in order to reduce the insertion loss between a micro-optics block and an optical chip and between the micro-optics block and the input/output fibre array. For this purpose, the optics blocks disclosed herein may comprise an alignment trimmer.

Figure 11:
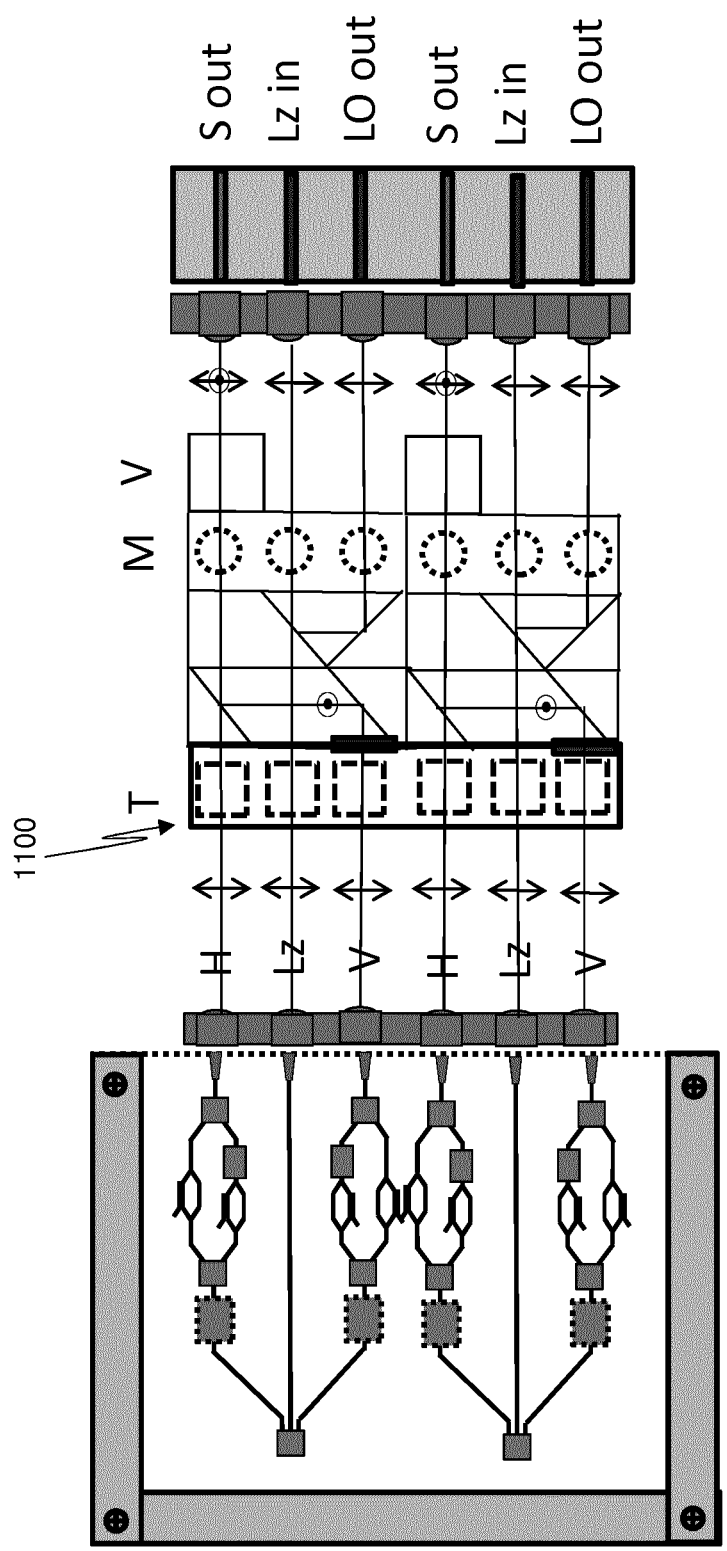

Alignment trimmers 1100 may be constructed as integral parts of an optics block, as shown in FIG. 11. Alignment may be beam by beam or may be for all beams in an optics block. Optionally, the alignment trimmers may be along one optical edge of an optics block, but in exemplary apparatus there may be alignment trimmers on both sides of the optics blocks.

Figure 12A:
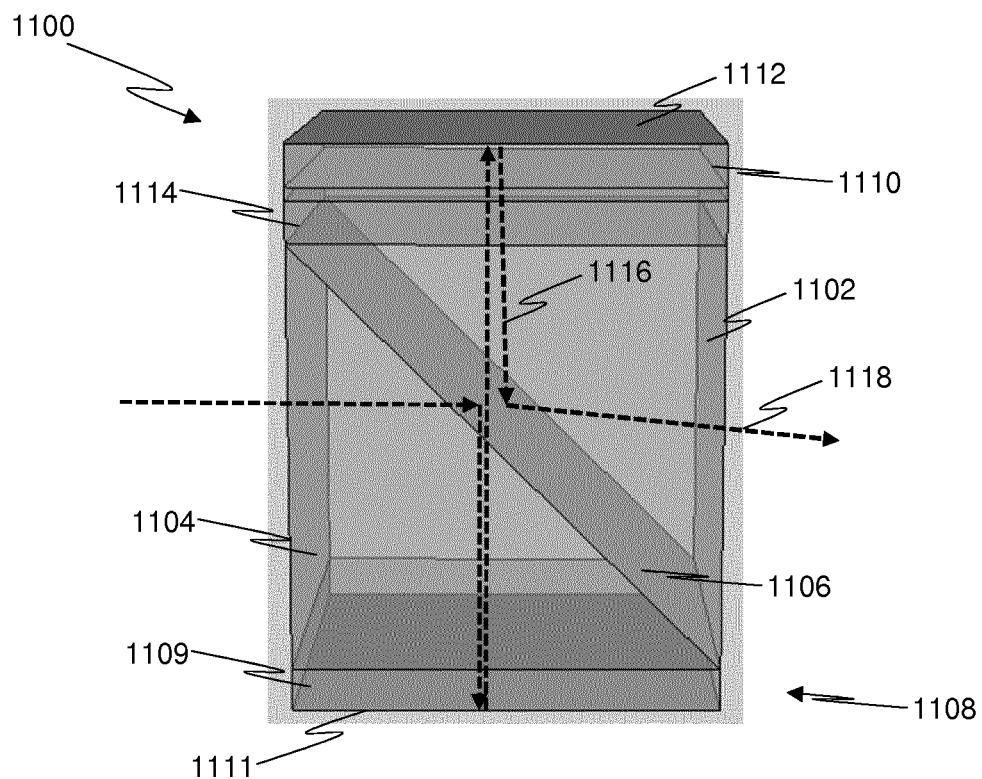
FIGS. 12a, 12b and 13 are schematic representations of alignment trimmers.

FIG. 12a shows a representation of an alignment trimmer 1100 or beam steerer. The alignment trimmer 1100 comprises a first right angled triangle prism 1102 and a second right angled triangle prism 1104. Hypotenuse surfaces of the first and second prisms 1102, 1104 are arranged facing each other and separated by a dielectric material at an interface 1106. The interface 1106 is configured to reflect light having a first polarisation and to pass light having a second polarisation orthogonal to the first polarisation. A first polarisation rotating mirror 1108 is located at a surface of the alignment trimmer 1100 for receiving light signals reflected by the interface 1106. The polarisation rotating mirror 1108 may comprise a polarisation rotator 1109, such as a quarter wave plate, and a reflective surface 1111. A second polarisation rotating mirror 1110 is located on a surface of the alignment trimmer 1100 opposing the first polarisation rotating mirror 1108. As with the polarisation mirror 1108, the polarisation rotating mirror 1110 may comprise a polarisation rotator, such as a quarter wave plate, and a reflective surface. The first and second polarisation rotating mirrors 1108, 1110 may comprise a glass (or a similar material) slab with a mirror typically consisting of a metallised coating 1112 on an outer surface. The alignment trimmer 1100 may also incorporate optical path length correction by incorporating a top glass block 1114 of height h which would give an extension in path length of $2h$. This is shown in FIG. 12a, but is optional.

The second polarisation rotating mirror 1110 is bonded to the glass block 1114 by an adhesive, such as an adhesive resin. The second polarisation rotating mirror 1110 is configured to be aligned, for example by adjusting the angle of the mirror 1110 with respect to the prisms 1102, 1104 manually or by machine to locate the output angle of minimum loss before the adhesive is cured. When the correct alignment of the second polarisation mirror 1110 is achieved, the adhesive is cured to fix the alignment. In this case the thickness of the cured adhesive may vary across the interface between the second mirror 1110 and the top prism 1102.

An optical path of a light signal through the alignment trimmer 1100 is shown in FIG. 12a by dashed arrows. Polarised (for example, TE) light enters the alignment trimmer 1100 from the left. The beam is incident on the interface 1106 and is reflected at ninety degrees towards the first polarisation rotating mirror 1108. The reflected light signal is again reflected by the first polarisation mirror 1108 on the base of the lower prism 1104. This reflection changes the polarisation by ninety degrees and so the light traverses the interface 1106 and exits a top face of the top prism 1102 and is incident on the alignment adjusted second polarisation mirror 1110. The light signal reflected from the second mirror 1110 is again rotated in polarisation by ninety degrees (e.g. back to TE) and is reflected at the interface 1106 to exit as TE polarised light to the right.

As can be seen in FIG. 12a, the angle of reflection from the second polarisation rotating mirror 1110 is not vertical and has been altered by the alignment of the second mirror 1110. Therefore, the reflected light signal 1116 is incident on the interface 1106 at a shallower angle and so the angle at which the light signal 1118 exits the alignment trimmer 1100 is different to the angle at which light entered the alignment trimmer 1100.

Figure 12B:
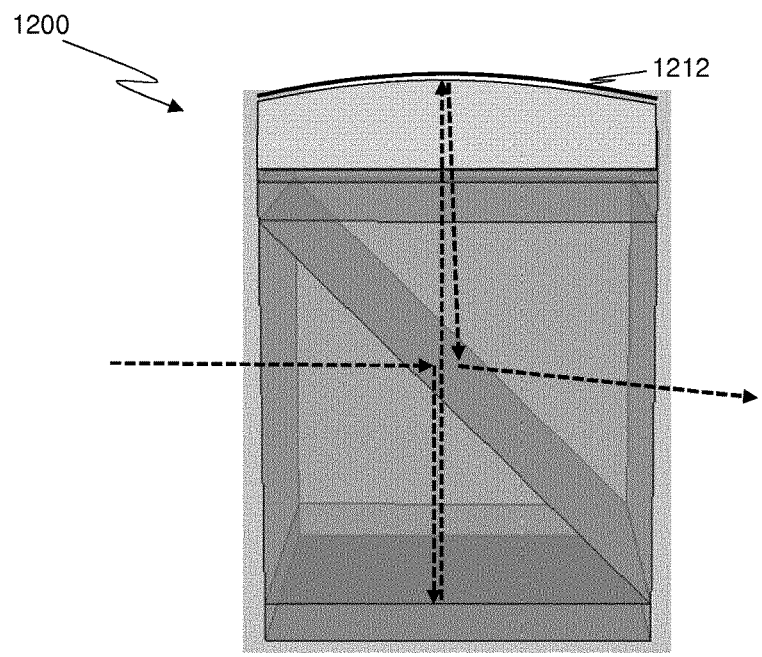

In an alternative alignment trimmer 1200 shown in FIG. 12b, the second polarisation rotating mirror comprises a polarisation rotator, such as a quarter wave plate, and convex or concave reflective surface 1212. The remaining features of the alignment trimmer 1200 are similar to those discussed above and are not discussed in detail again.

As with the alignment trimmer 1100, the convex or concave reflective surface 1212 is set upon a layer of adhesive, but in this case the adhesive may remain substantially uniform in thickness. Trimming is achieved by adjusting the position of the convex or concave reflective surface 1212 in the plane of the interface between the top cap and the prism block. This exposes a different area of the dome to the light signal, which shifts the optical axis with respect to the beam, thereby altering the angle of reflection. Once the desired trimming position has been achieved, the resin is cured. Advantages of this arrangement are that the angle of trim is less likely to be affected by any shrinkage or warping of the resin during curing or aging and correction sensitivity can be varied by design.

Figure 13:
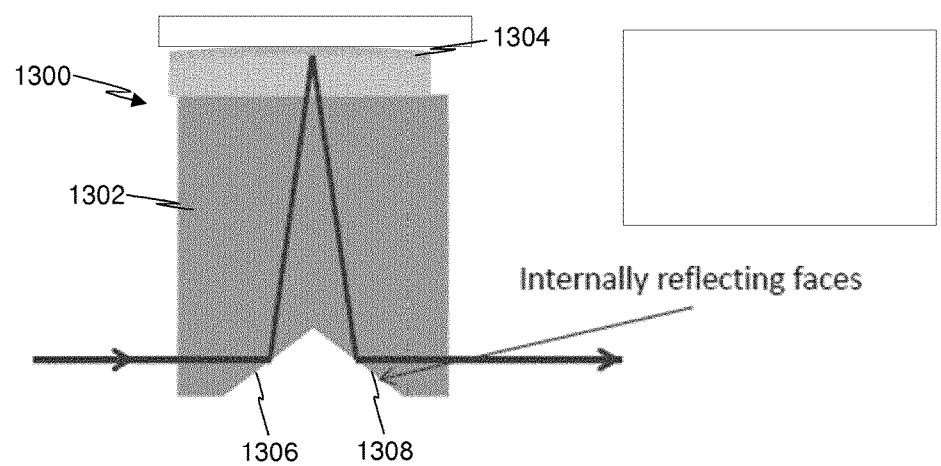

FIG. 13 shows a further alignment trimmer 1300 in which the vertical deflection of the incoming light signal is achieved by a deflector/reflector block 1302. The alignment trimmer 1300 further comprises a mirror 1304 positioned at an upper surface of the deflector/reflector block 1302. As with the alignment trimmers 1100, 1200 mentioned above, the mirror 1304 may comprise a convex or concave reflective surface or a flat reflective surface and is set upon a layer of adhesive that is cured after alignment of the mirror 1304. The deflector/reflector block 1302 comprises internally reflecting facets 1306, 1308. A first internally reflecting facet 1306 is arranged to reflect an incoming light signal towards the mirror 1304 and a second internally reflecting facet is arranged to reflect a light signal received from the mirror 1304 out of the alignment trimmer 1300. As with the alignment trimmer 1100, 1200, the alignment of the mirror 1304 determines the angle of exit of the light signal from the alignment trimmer 1304. The path of a light signal through the alignment trimmer 1300 is shown in FIG. 13.

In similar arrangements the polarisation dependent out of plane beam can be modified and controlled. VOA functionality could be achieved using liquid crystal cells for example and structures may be used that combine this functionality with monitoring and trimming.

For manufacturing reasons and for reasons of standardisation and interoperability, it is often desirable to have a set and regular spacing between fibre connectors and between ports or optical facets on an optical chip. Components such as arrays of lenses or micro-lenses are manufactured having a standard pitch and it is often economic to use off-the-shelf components of the dimensions available commercially.

Figure 14:
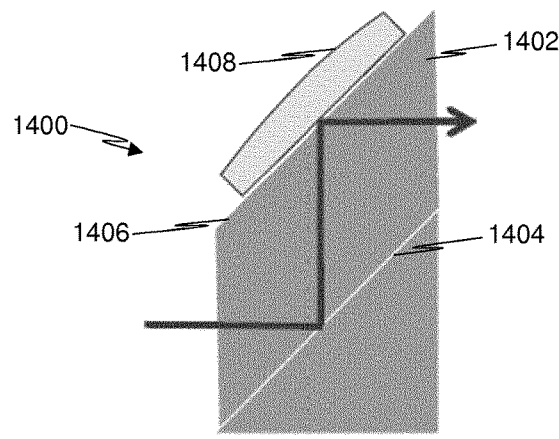
FIG. 14 is a schematic representation of a pitch transformation block.

An example in the methods and apparatus disclosed herein is where lenses are used between an optical chip and an optics block and/or between an optics block and optical fibre connectors/fibre arrays. Pitch transformation in order to align the features of an optical component with a lens array may be accomplished with optics blocks comprising pitch transformation blocks 1400, as shown in FIG. 14. The pitch transformation block 1400 comprises a generally rhomboidal shaped transmissive element 1402 comprising opposed and substantially parallel surfaces 1404, 1406 configured to reflect light signals. Light passing through the transmissive element is shown by the arrow in FIG. 14.

The transmissive element 1402 is arranged such that light entering the pitch transformation block 1400 reflects off the surfaces 1404, 1406 and exits the pitch transformation block 1400 in the same direction, but offset.

The pitch transformation block 1400 includes the optional feature of a mirror 1408, which is configured to adjust the angle of the output beam with respect to the input beam. The mirror 1408 may be flat and bonded to the surface 1406 at an angle so as to deflect the light signal at a different angle. Alternatively, and as seen in FIG. 14, the mirror 1408 may be a curved mirror with either a concave or convex reflective surface.

Figure 15:
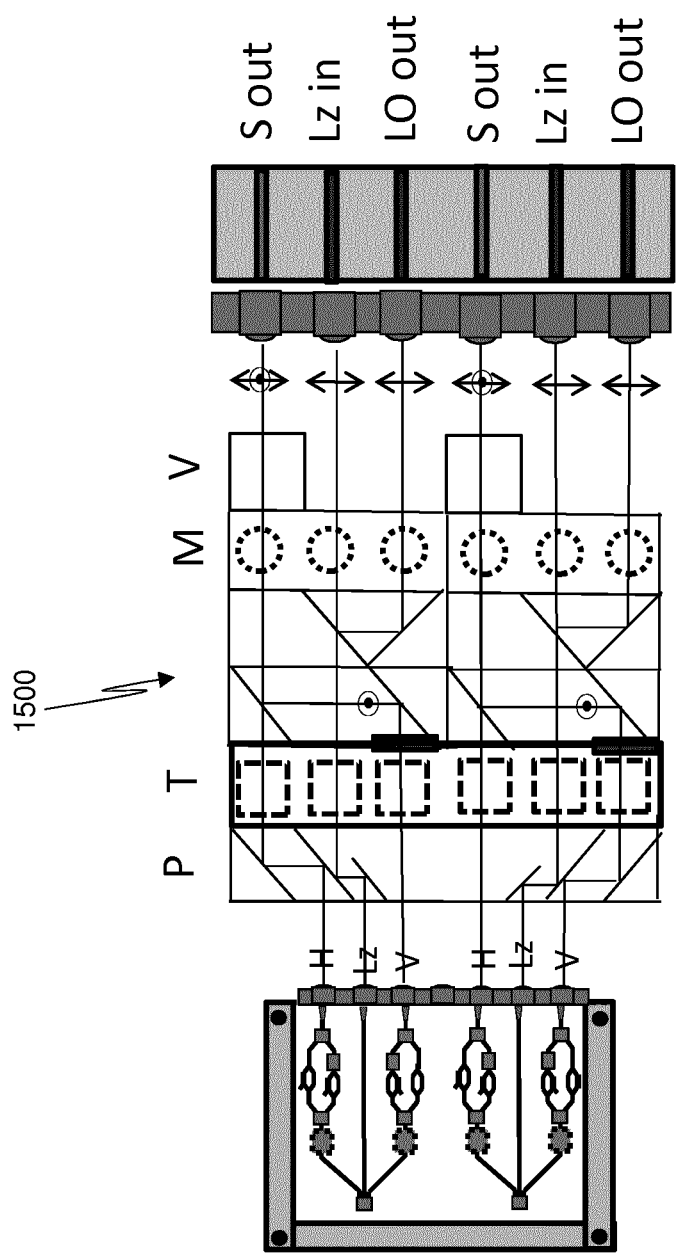

FIG. 15 shows an integrated optics block comprising a plurality of alignment trimmers 1500 implemented as part of a coherent transmitter (although the integrated optics block may alternatively be incorporated into a coherent receiver or transceiver).

One or more pitch transformation blocks may be incorporated into an optics block 1500 of the beam splitter or combiner, as shown in FIG. 15. The pitch transformation block shown in FIG. 15 is different to that shown in FIG. 14, although the pitch transformation block 1400 of FIG. 14 may be implemented in an integrated optics block 1500 in a similar way to that shown. When using an array of lenses, it may be appropriate that a pitch of, say 250 micrometers on one side is doubled to 500 micrometers on the other side and that the lens array of the 500 micrometers side may have 50% redundant lenses or lens and fibre array block on an different pitch. Other similar arrangements would form part of the methods and apparatus disclosed. Although a quarter wave plate could be sandwiched between a beam splitter block and a pitch transforming block, it may be preferable to place the quarter wave plate on the surface of the block, and, in this case on the face of the pitch transforming block.

Figure 16:
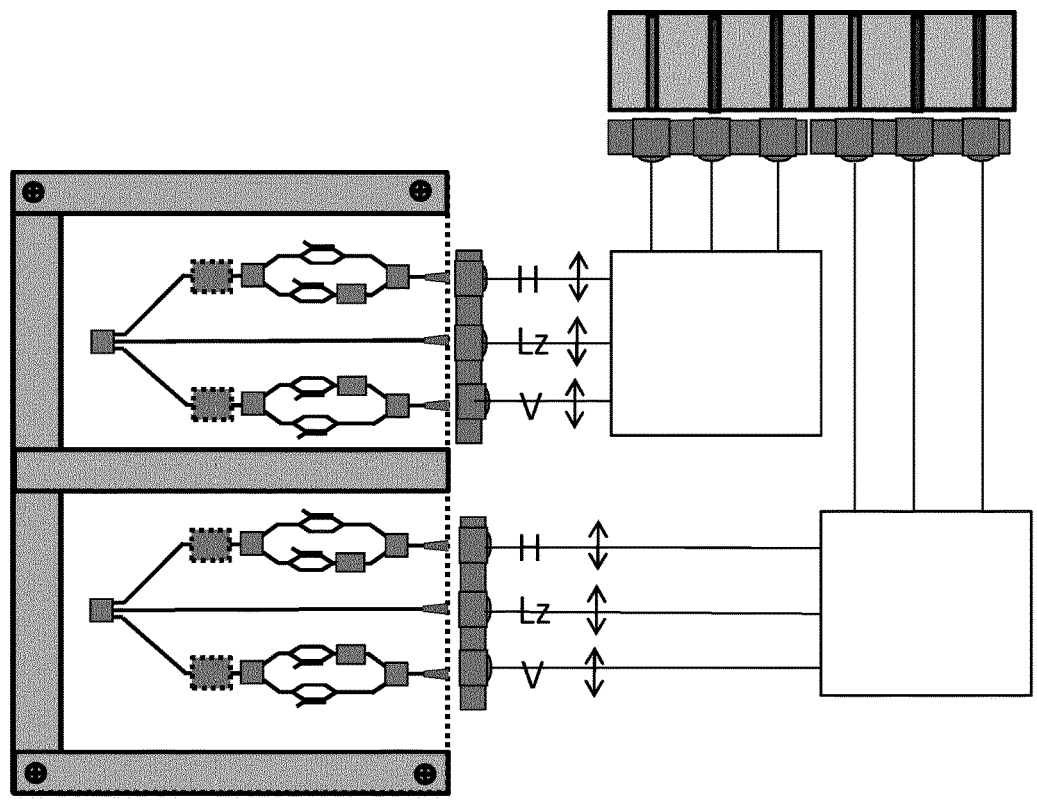

In other exemplary apparatus, an optics block (with or without beam pitch adjustment) may confer a ninety degree turn so that the output beams are orthogonal to the beams traversing the optical chip. Such an exemplary apparatus is shown in FIG. 16 for an example which has two optical chips mounted coplanar. An optical chip may contain more than one transmitter/modulator or receiver. In certain exemplary apparatus, not shown, the angular relationship of the beams traversing the chip to the output beams may be an angle other than ninety degrees.

Figure 17:
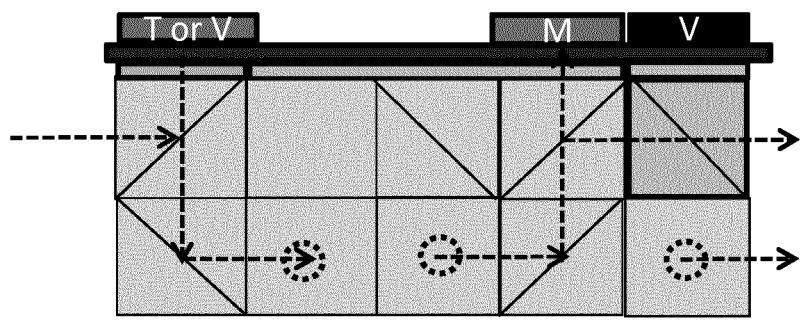
FIG. 17 is a schematic representation of integrated optics blocks stacked vertically.

In yet a further exemplary apparatus (not shown), multiple optical chips may be mounted upon steps, thus enabling optical beams for one chip to be in a parallel plane to the others. Similarly the integrated optical blocks could be stacked in the vertical plane with beams transferring between planes as and when required by the functional requirement, as shown in FIG. 17. Such an exemplary apparatus allows the output and input optical beams to a multi-chip package to be arranged in a matrix.

The skilled person will be able to envisage alternative embodiments without departing from the claims.

The invention claimed is:

1. An integrated optics block for use in a coherent optical transmitter, the optics block comprising:
   a beam splitter configured to receive an input light signal, to split the input light signal into first and second input light signals, to output the first input light signal for use in an optical transmitter chip and to output the second input light signal for use as a local oscillator signal;
   a polarisation combiner configured to receive first and second modulated light signals from an optical transmitter chip and to combine the first and second modulated light signals to form an output; and
   a polarisation rotator configured to rotate the polarisation of the second modulated light signal such that it is substantially orthogonal to the polarisation of the first modulated light signal prior to combining;
   wherein the beam splitter comprises a prism;
   and wherein a surface of the prism through which the first input light signal passes, abuts a surface of the polarisation combiner, and wherein the first input light signal passes through the polarisation combiner before output to an optical transmitter chip.

2. The integrated optics block according to claim 1, wherein the polarisation combiner is configured to receive the first modulated light signal and pass the first modulated light signal directly to a signal output.

3. The integrated optics block according to claim 2, wherein the polarisation rotator abuts a surface of the polarisation combiner and is configured to rotate the polarisation of the second modulated light signal prior to entry into the polarisation combiner.

4. The integrated optics block according to claim 1, wherein the first and second modulated light signals are spatially separated, and wherein the polarisation combiner is configured to direct the second modulated light signal to be aligned with the first modulated light signal for combination.

5. An optical component comprising one or more integrated optics blocks according to claim 1.

6. A coherent optical transmitter or transceiver device comprising one or more integrated optics blocks according to claim 1.

7. An integrated optics block for use in a coherent optical transmitter, the optics block comprising:
a beam splitter configured to receive an input light signal, to split the input light signal into first and second input light signals, to output the first input light signal for use in an optical transmitter chip and to output the second input light signal for use as a local oscillator signal;
a polarisation combiner configured to receive first and second modulated light signals from an optical transmitter chip and to combine the first and second modulated light signals to form an output; and
a polarisation rotator configured to rotate the polarisation of the second modulated light signal such that it is substantially orthogonal to the polarisation of the first modulated light signal prior to combining; and
a variable optical attenuator configured to attenuate the power in an optical signal based on at least one optical power measurement.

8. The integrated optics block according to claim 7, wherein the variable optical attenuator comprises a dielectric region configured to pass a proportion of a light signal incident on the dielectric layer and to reflect the remaining proportion of the light signal.

9. The integrated optics block according to claim 8, wherein the dielectric region comprises a gap between two optical transmission components.

10. The integrated optics block according to claim 9, wherein the gap comprises one of: a vacuum; air; and a dielectric material.

11. The integrated optics block according to claim 8, wherein the variable optical attenuator comprises first and second prisms separated by the dielectric region.

12. The integrated optics block according to claim 8, wherein the variable optical attenuator comprises a control mechanism configured to alter the interface to vary the proportion of the light signal that passes through.

13. The integrated optics block according to claim 12, wherein at least part of the control mechanism is connected to a surface of the variable optical attenuator such that deflection thereof alters the interface, and wherein the control mechanism comprises one of: a thermally controlled bi-metallic strip; and a piezo-electric element.

14. The integrated optics block according to claim 7, wherein the variable optical attenuator is configured to operate as an optical shutter.

15. An integrated optics block for use in a coherent optical transmitter, the optics block comprising:
a beam splitter configured to receive an input light signal, to split the input light signal into first and second input light signals, to output the first input light signal for use in an optical transmitter chip and to output the second input light signal for use as a local oscillator signal;
a polarisation combiner configured to receive first and second modulated light signals from an optical transmitter chip and to combine the first and second modulated light signals to form an output; and
a polarisation rotator configured to rotate the polarisation of the second modulated light signal such that it is substantially orthogonal to the polarisation of the first modulated light signal prior to combining; and
an alignment trimmer configured to alter a direction of one or more light signals propagating through the optics block for mitigating misalignment of one or more elements of the optics block.

16. The integrated optics block according to claim 15, wherein the alignment trimmer comprises a dielectric layer configured to reflect light having a first polarisation and to pass light having a second polarisation orthogonal to the first polarisation, and further comprising at least one polarisation rotating mirror configured to reflect light signals such that the reflected light signal has its polarisation rotated by substantially ninety degrees and arranged to receive a reflected light signal from the dielectric layer and to alter an angle of the reflected light signal.

17. The integrated optics block according to claim 16, wherein the alignment trimmer further comprises first and second prisms separated by the dielectric layer.

18. The integrated optics block according to claim 16, wherein the alignment trimmer further comprises first and second polarisation rotating mirrors on opposing surfaces of the alignment trimmer,
wherein the first polarisation rotating mirror is configured to receive a first light signal having a first polarisation that has entered the alignment trimmer and been reflected from the dielectric layer and to reflect the first light signal to produce a second light signal having a second polarisation substantially orthogonal to the first polarisation, such that the second light signal may pass through the dielectric layer,
and wherein the second polarisation rotating mirror is configured to receive the second light signal and to reflect the second light signal to produce a third light signal having the first polarisation, such that the third light signal is reflected by the dielectric layer and exits the alignment trimmer,
and wherein one or both of the first and second polarisation rotating mirrors is aligned such that the third light signal exits the alignment trimmer at a different angle to the angle that the first light signal entered the alignment trimmer.

19. The integrated optics block according to claim 16, wherein the at least one polarisation rotating mirror is held in place by an adhesive and may be set to a desired alignment before the adhesive is cured.

20. The integrated optics block according to claim 16, wherein the at least one polarisation rotating mirror comprises a curved reflecting surface.

21. The integrated optics block according to claim 16, wherein the alignment trimmer further comprises an optical transmission block between the at least one polarisation rotating mirror and a corresponding surface of the alignment trimmer.

22. The integrated optics block according to claim 15, wherein the alignment trimmer comprises a transmissive optical element comprising first and second internal facets and at least one mirror, wherein the alignment trimmer is configured to reflect a received light signal off the first internal facet, off the at least one mirror and the second internal facet to be output from the alignment trimmer at an angle determined by an alignment of the mirror.

23. An integrated optics block for use in a coherent optical transmitter, the optics block comprising:
   a beam splitter configured to receive an input light signal, to split the input light signal into first and second input light signals, to output the first input light signal for use in an optical transmitter chip and to output the second input light signal for use as a local oscillator signal;
   a polarisation combiner configured to receive first and second modulated light signals from an optical transmitter chip and to combine the first and second modulated light signals to form an output; and
   a polarisation rotator configured to rotate the polarisation of the second modulated light signal such that it is substantially orthogonal to the polarisation of the first modulated light signal prior to combining; and
   a pitch transformer configured to control the pitch between light signals output from and input to the optics block, wherein the pitch transformer comprises:
      a transmissive optical element comprising opposed substantially parallel surfaces arranged to be angled with respect to a direction of a received light signal, wherein the opposed surfaces are configured such that a received light signal is reflected from each of the opposed surfaces and is output from the pitch transformer substantially parallel to and offset from the direction of the received light signal.

24. The integrated optics block according to claim 23, comprising a plurality of pitch adjusters arranged to provide a plurality of outputs and/or inputs and having a common pitch of substantially 250 micrometers.

25. A coherent optical transmitter or transceiver device comprising one or more integrated optics blocks, each of the one or more integrated optics blocks comprising:
   a beam splitter configured to receive an input light signal, to split the input light signal into first and second input light signals, to output the first input light signal for use in an optical transmitter chip and to output the second input light signal for use as a local oscillator signal;
   a polarization combiner configured to receive first and second modulated light signals from an optical transmitter chip and to combine the first and second modulated light signals to form an output; and
   a polarization rotator configured to rotate the polarization of the second modulated light signal such that it is substantially orthogonal to the polarization of the first modulated light signal prior to combining,
   wherein the coherent optical transmitter or transceiver device comprises one or more optical chips, the one or more integrated optics blocks being arranged to emit light signals to and receive light signals from the one or more optical chips; and
   wherein the coherent optical transmitter or transceiver device further comprises one or more arrays of lenses positioned between the one or more integrated optics blocks and the one or more optical chips, wherein a plurality of lenses in the array of lenses is configured to focus light passing between the integrated optics block and the optical chip.

26. The coherent optical transmitter or transceiver device according to claim 25, comprising a plurality of optical transmitter chips, wherein the integrated optics block is arranged to emit light signals to and receive light signals from one of the plurality of optical transmitter chips.

27. The coherent optical transmitter or transceiver device according to claim 26, comprising a plurality of integrated optics blocks arranged to form a single monolithic structure.

28. The coherent optical transmitter or transceiver device according to claim 25, wherein the one or more optics blocks are configured to receive an input light signal from a direction transverse to a direction of light signals entering and exiting the one or more optical chips.

29. The coherent optical transmitter or transceiver device according to claim 25, further comprising one or more tunable lasers configured to provide an input light signal to the one or more optics blocks.

30. The coherent optical transmitter or transceiver device according to claim 25, wherein the one or more optical chips comprises an optical chip comprising a plurality of optical transmitters, or at least one optical transmitter and at least one optical receiver.

* * * * *